(12) United States Patent
Asahi et al.

(10) Patent No.: US 7,490,877 B2
(45) Date of Patent: Feb. 17, 2009

(54) VEHICLE BUMPER STRUCTURE

(75) Inventors: Masahiro Asahi, Fuchu-cho (JP);
Teruhisa Noda, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 40 days.

(21) Appl. No.: 11/806,456

(22) Filed: May 31, 2007

(65) Prior Publication Data
US 2008/0001417 A1 Jan. 3, 2008

(30) Foreign Application Priority Data
Jun. 29, 2006 (JP) ............... 2006-179408

(51) Int. Cl.
*B60R 19/04* (2006.01)
(52) U.S. Cl. ..................................... 293/155
(58) Field of Classification Search ............... 293/102, 293/132, 154, 155
See application file for complete search history.

(56) References Cited

U.S. PATENT DOCUMENTS

| 6,286,879 | B1 * | 9/2001 | Haque et al. | 293/120 |
| 6,290,272 | B1 * | 9/2001 | Braun | 293/120 |
| 6,315,339 | B1 * | 11/2001 | Devilliers et al. | 293/132 |
| 6,695,366 | B2 * | 2/2004 | Cherry | 293/120 |
| 6,712,411 | B2 * | 3/2004 | Gotanda et al. | 293/155 |
| 6,863,322 | B2 * | 3/2005 | Hunter et al. | 293/120 |
| 2003/0034657 | A1 | 2/2003 | Garcia et al. | |
| 2003/0080573 | A1 * | 5/2003 | Marijnissen et al. | 293/132 |
| 2008/0001417 | A1 * | 1/2008 | Asahi et al. | 293/155 |

FOREIGN PATENT DOCUMENTS

| EP | 0 370 342 | 5/1990 |
| FR | 2 856 023 | 12/2004 |
| JP | 6-171441 | 6/1994 |
| JP | 2002-274297 | 9/2002 |
| WO | WO 02/38418 | 5/2002 |

* cited by examiner

*Primary Examiner*—H Gutman

(57) ABSTRACT

A bumper reinforcement (10) of a vehicle bumper structure (1) includes a beam member (20), a plate member (30), a plurality of upper end joints (40) by which upper ends of the beam member (20) and the plate member (30) are joined at plural points arranged widthwise, and a plurality of lower end joints (45) by which lower ends of the beam member (20) and the plate member (30) are joined at plural points arranged widthwise. The plate member (30) has a plurality of openings (35) formed therein at properly determined intervals widthwise across the vehicle body as well as a plurality of bead portions (36), each of the bead portions (36) passing between two adjacent openings (35) and bridging one of the upper end joints (40) to the corresponding one of the lower end joints (45).

5 Claims, 17 Drawing Sheets

VEHICLE BUMPER STRUCTURE

BACKGROUND OF THE INVENTION

1. Field of the Invention

The present invention relates to a structure of a bumper of a vehicle and, more particularly, pertains to a structure of a vehicle bumper whose bumper reinforcement is provided with a plate member having plural openings and plural bead portions formed therein.

2. Description of the Related Art

A conventional bumper structure of a vehicle includes a bumper reinforcement which is mounted between front or rear ends of left and right body frame members, that is, front ends of left and right front side frame members in the case of a front bumper, rear ends of left and right rear side frame members in the case of a rear bumper. The bumper reinforcement includes a beam member extending widthwise across the vehicle body, the beam member having a C-shaped cross section, and a plate member extending widthwise and closing off an open end of the beam member, wherein the beam member and the plate member are united with upper ends of both members joined to each other as are lower ends of both members. As an example, Japanese Unexamined Patent Publication No. 2002-274297 describes this kind of conventional bumper structure.

In the bumper reinforcement thus structured, the beam member and the plate member together form a closed cross section, or a box section, which serves to provide increased strength and stiffness. The box section structure is intended to prevent the bumper reinforcement from becoming unnecessarily collapsed when subjected to an impact load in the event of a vehicle collision. This conventional structure makes it possible to transmit the impact load to a vehicle body frame through a so-called crush can to thereby provide a desired level of energy-absorbing performance.

There is a growing need today for reducing the weight of the bumper reinforcement to help achieve a further reduction in vehicle body weight. In the aforementioned vehicle bumper structure employing the bumper reinforcement provided with the beam member and the plate member which are joined together to form a box section, however, there is a problem that this structure does not allow for a reduction in the vehicle body weight although the structure provides increased strength and stiffness.

One approach that makes possible a reduction in weight of the bumper reinforcement would be to make a plurality of openings in the bumper reinforcement. This approach however develops a problem that a loss of strength and stiffness of the bumper reinforcement will result.

SUMMARY OF THE INVENTION

In light of the foregoing, it is an object of the invention to provide a vehicle bumper structure which makes it possible to reduce the weight of a bumper reinforcement without causing a loss of strength and stiffness of the bumper reinforcement.

To achieve the aforementioned object, a vehicle bumper structure of the invention includes a bumper reinforcement mounted between extreme ends of left and right body frame members of a vehicle, the bumper reinforcement including a beam member extending widthwise generally all across a vehicle body, the beam member having a C-shaped cross section, a plate member extending widthwise along the beam member and closing off an open end thereof, a plurality of upper end joints by which upper ends of the beam member and the plate member are joined at plural points arranged widthwise, and a plurality of lower end joints by which lower ends of the beam member and the plate member are joined at plural points arranged widthwise. In this vehicle bumper structure, the plate member has a plurality of openings formed therein at properly determined intervals widthwise across the vehicle body as well as a plurality of bead portions, each of the bead portions passing between two adjacent openings and bridging one of the upper end joints to the corresponding one of the lower end joints.

In the vehicle bumper structure of the invention thus configured, the bumper reinforcement includes the beam member extending widthwise generally all across the vehicle body, the beam member having a C-shaped cross section, the plate member extending widthwise along the beam member and closing off the open end thereof, the plurality of upper end joints by which the upper ends of the beam member and the plate member are joined at plural points arranged widthwise, and the plurality of lower end joints by which the lower ends of the beam member and the plate member are joined at plural points arranged widthwise.

According to this vehicle bumper structure, it is possible to reinforce the beam member by a closed cross section, or a so-called box section, partially formed between the beam member and the plate member.

In the vehicle bumper structure of the invention configured as stated above, the plate member has the plurality of openings formed therein at the properly determined intervals widthwise across the vehicle body, so that the vehicle bumper structure of the invention allows for lightweight design of the bumper reinforcement. Additionally, as there are formed the plurality of bead portions, each of the bead portions passing between two adjacent openings and bridging one of the upper end joints to the corresponding one of the lower end joints, it is possible to join both ends of each bead portion to the beam member with enhanced strength and reinforce portions of the plate member between the adjacent openings in the plate member by the bead portions in a reliable fashion.

Consequently, compared to a bumper reinforcement in which only a plurality of openings are formed in a plate member, the plurality of bead portions formed between the adjacent openings significantly increase the strength and stiffness, including torsional stiffness, of the bumper reinforcement. In other words, the bead portions of the invention serve to prevent a reduction in the strength and stiffness of the bumper reinforcement which may otherwise result from the provision of the openings formed in the plate member.

These and other objects, features and advantages of the invention will become more apparent upon a reading of the following detailed description in conjunction with the accompanying drawings.

DETAILED DESCRIPTION OF THE PREFERRED EMBODIMENTS OF THE INVENTION

Stated in general terms, a vehicle bumper structure of the present invention includes a bumper reinforcement which is mounted between front or rear ends of left and right body frame members, the bumper reinforcement including a beam member extending widthwise generally all across a vehicle body, the beam member having a C-shaped cross section (which is made as if by removing one side of a rectangular cross section), and a plate member extending widthwise along the beam member and closing off an open end thereof. The beam member and the plate member have a plurality of upper end joints and lower end joints formed at upper ends and lower ends of the respective members for joining these two facing members at plural points along the bumper reinforcement. The plate member has a plurality of openings formed therein at properly determined intervals widthwise across the vehicle body as well as a plurality of bead portions extending obliquely between the upper end and lower end of the plate member, each of the bead portions passing between two adjacent openings and interconnecting the corresponding upper end and lower end joints of the plate member.

First Embodiment

Figure 1:
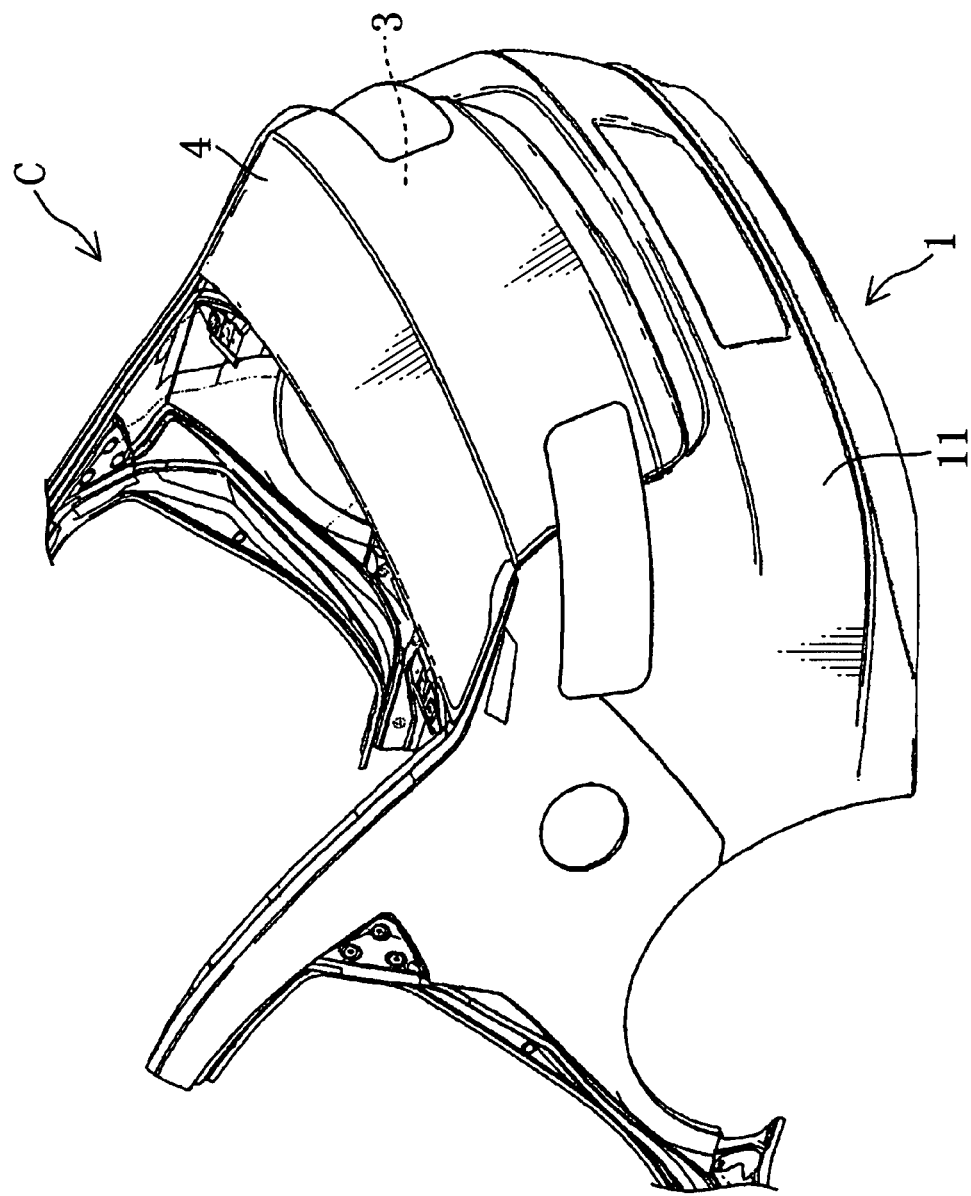
FIG. 1 is a perspective view showing a rear portion of a vehicle provided with a bumper structure according to a first embodiment of the invention.
Figure 2:
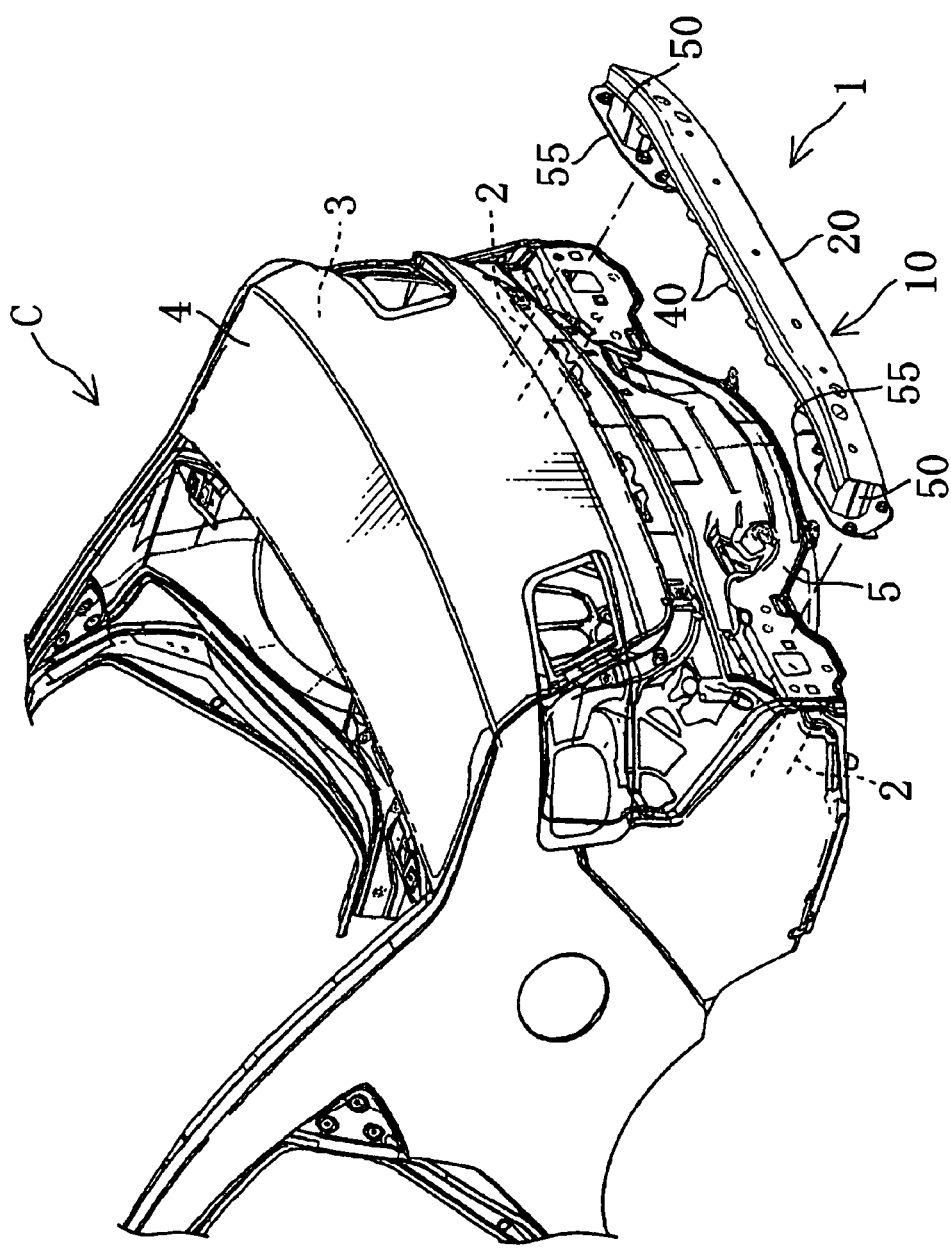
FIG. 2 is a perspective view showing the rear portion of the vehicle of FIG. 1 with a bumper reinforcement separated from a vehicle body frame.
Figure 3:
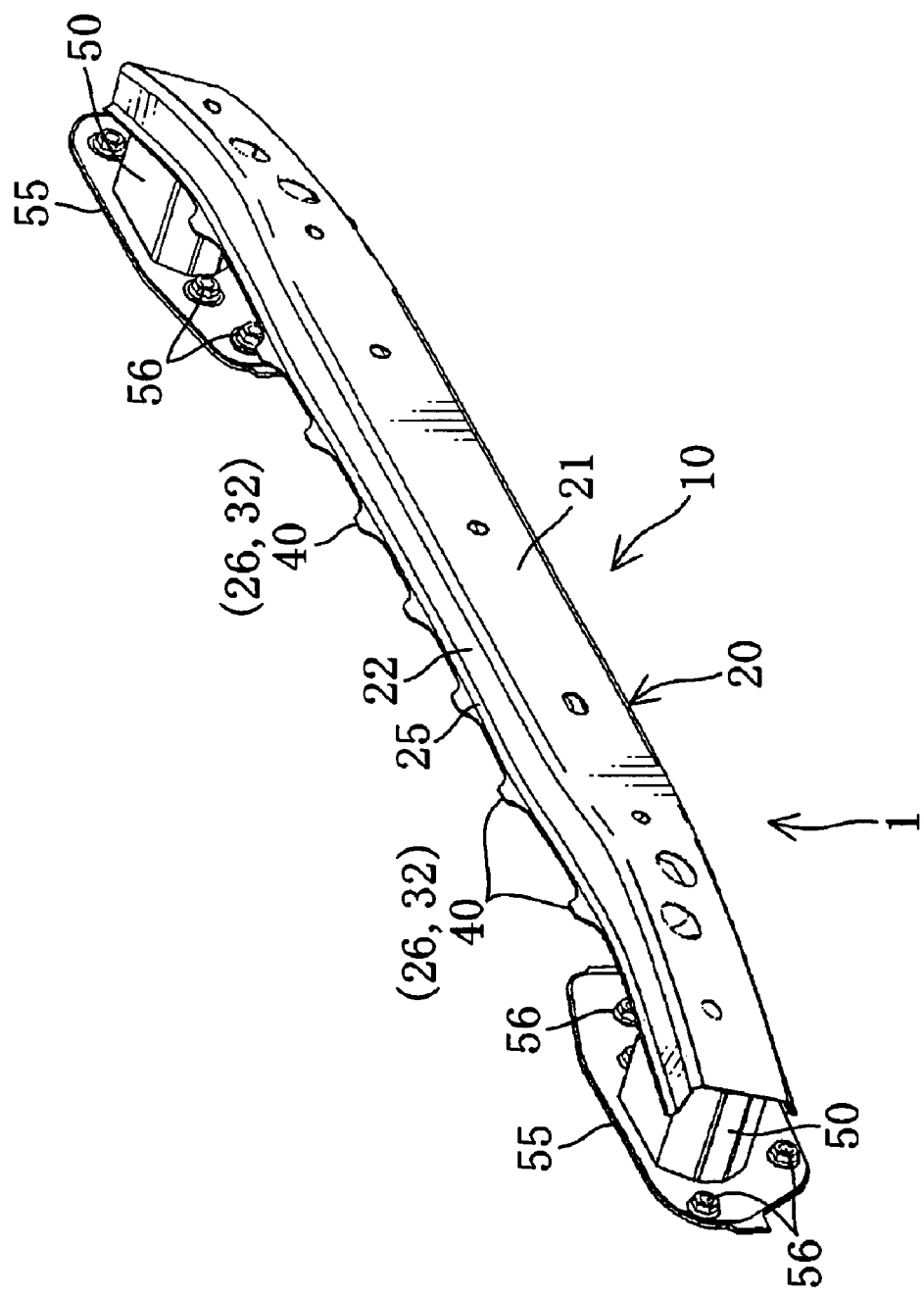
FIG. 3 is a perspective view of the bumper reinforcement as viewed obliquely from a rear side of the vehicle of FIG. 1.

FIGS. 1 and 2 are perspective views showing a rear portion of a vehicle C provided with a bumper structure 1 according to a first embodiment of the invention. As illustrated in these Figures, the bumper structure 1 of this embodiment, which is for a rear bumper of the vehicle C, includes a metallic bumper reinforcement 10 which is mounted between rear ends of left and right rear side frame members 2 of a body frame of the vehicle C, the bumper reinforcement 10 extending widthwise across a vehicle body, and a plastic bumper face 11 which is configured to cover a lower rear part of the vehicle body including a rear side of the bumper reinforcement 10 as well as left and right sides thereof.

The vehicle C has a rear luggage compartment 3 which is opened and closed by lifting up and down a trunk lid 4. As shown in FIG. 1, a rear end panel 5 constituting a lower rear wall of the rear luggage compartment 3 extends downward beneath the rear luggage compartment 3 as well as to the rear of the left and right rear side frame members 2. The bumper reinforcement 10 is affixed to the rear ends of left and right rear side frame members 2 with the rear end panel 5 sandwiched in between.

Referring to FIGS. 3 to 10, the bumper reinforcement 10 includes a beam member 20 extending widthwise generally all across the vehicle body, the beam member 20 having a C-shaped cross section, and a plate member 30 extending widthwise along the beam member 20 and closing off an open end thereof. The beam member 20 and the plate member 30 have a plurality of upper end joints 40 and lower end joints 45 formed at upper ends and lower ends of the respective members 20, 30 for joining the two facing members 20, 30 at plural points (e.g., eight points) along the bumper reinforcement 10. The bumper reinforcement 10 further includes a pair of left and right crush cans 50 of which rear ends are joined to left and right end portions of the beam member 20 and a pair of left and right flange members 55 joined to front ends of the left and right crush cans 50, respectively. The left and right flange members 55 are joined to flange members (not shown) provided respectively at the rear ends of the left and right rear side frame members 2 by a plurality of bolts 56 with the rear end panel 5 sandwiched in between.

The beam member 20 has a rear wall portion 21, a top face portion 22 and a bottom face portion 23 together forming a frontward-opening C-shaped cross section. The rear ends of the aforementioned crush cans 50 are joined to a front side of the rear wall portion 21 of the beam member 20. The beam member 20 also has a top end flange 25 which is formed as if by bending a front marginal part of the top face portion 22 of the beam member 20 upward. As can be seen from FIG. 4, a plurality (eight in this embodiment) of upward projections 26 are formed along the top end flange 25 at appropriate widthwise intervals. The beam member 20 further includes a bottom end flange 27 which is formed as if by bending a front marginal part of the bottom face portion 23 of the beam member 20 downward, and the same number (eight in this embodiment) of downward projections 28 as the upward projections 26 are formed along the bottom end flange 27 at the same lateral positions and intervals as the upward projections 26.

Figure 4:
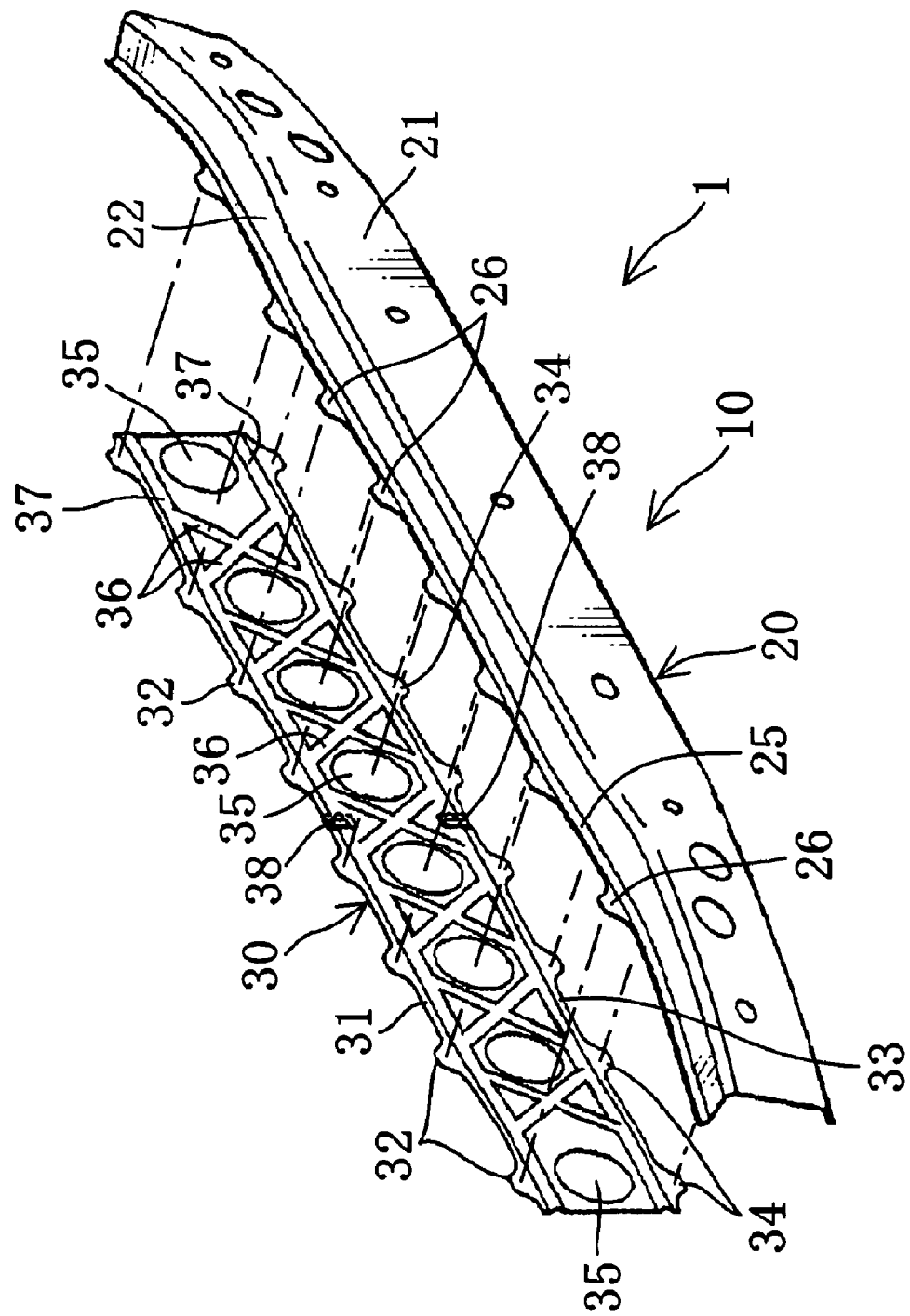
FIG. 4 is an exploded perspective view showing a principal portion of the bumper reinforcement as viewed obliquely from the rear side of the vehicle of FIG. 1.
Figure 5:
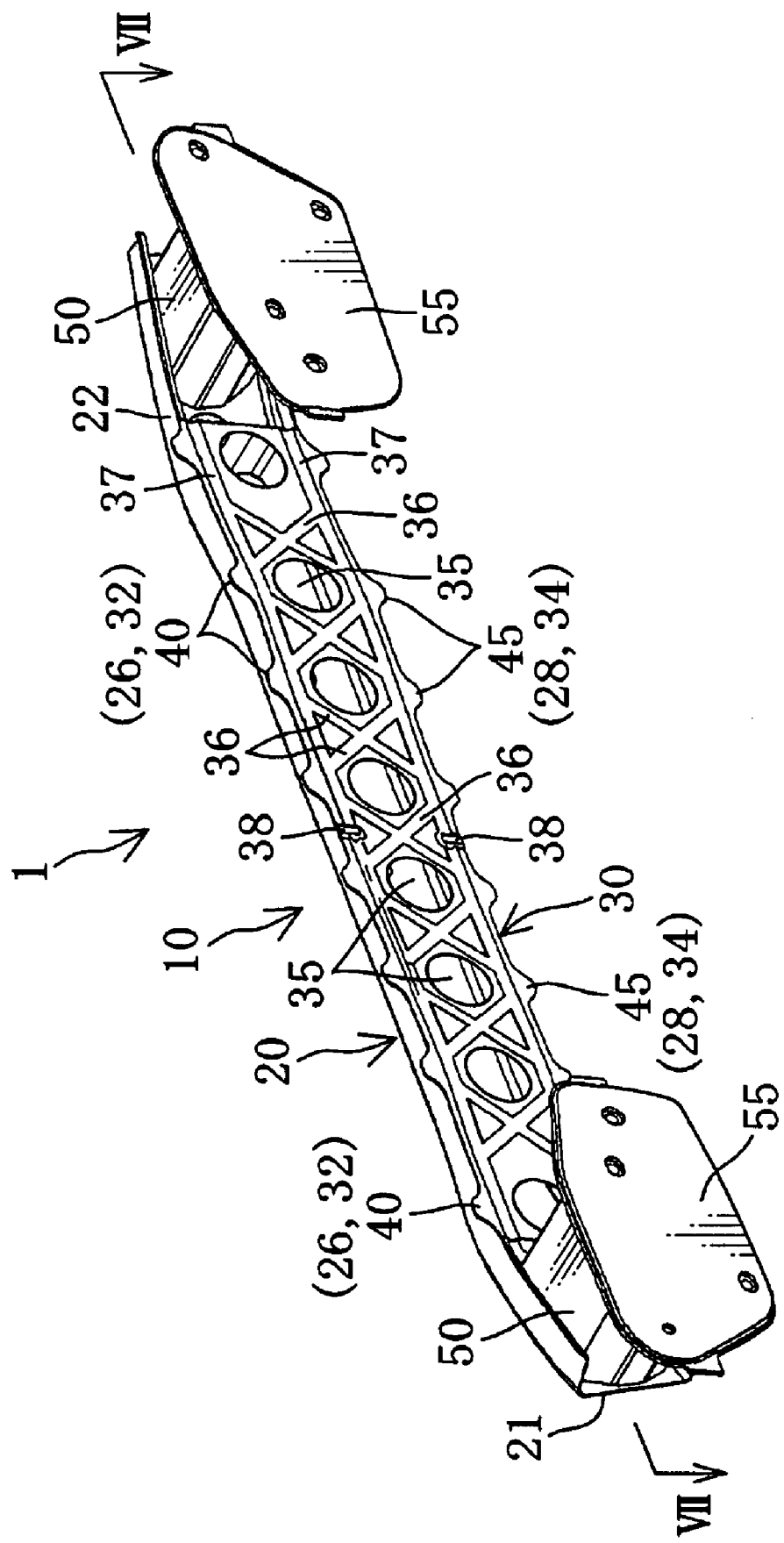
FIG. 5 is a perspective view of the bumper reinforcement as viewed obliquely from a front side of the vehicle of FIG. 1.

Having the same vertical width (height) as the beam member 20 and a little smaller left-to-right dimension (length) than the distance between the two crush cans 50, the plate member 30 is shaped in a generally vertical flat platelike form and disposed to close off the open end of the beam member 20 at the front side thereof. Along the upper end of the plate member 30, there is formed an upper end contact part 31 which goes into contact with the top end flange 25 of the beam member 20. Referring to FIG. 4, a plurality (eight in this embodiment) of upward projections 32 which go into contact with the aforementioned upward projections 26 are formed along the top end flange 25 of the beam member 20. Along the lower end of the plate member 30, there is formed a lower end contact part 33 which goes into contact with the bottom end flange 27 of the beam member 20. A plurality (eight in this embodiment) of downward projections 34 which go into contact with the aforementioned downward projections 28 are formed along the lower end contact part 33 of the plate member 30.

With the top and bottom end flanges 25, 27 at the upper and lower ends of the beam member 20 held in contact with the upper and lower end contact parts 31, 33 at the upper and lower ends of the plate member 30, respectively, the upward projections 26 of the beam member 20 are spot-welded to the corresponding upward projections 32 of the plate member 30 to configure the aforementioned upper end joints 40, and the downward projections 28 of the beam member 20 are spot-welded to the corresponding downward projections 34 of the plate member 30 to configure the aforementioned lower end joints 45, whereby the beam member 20 and the plate member 30 are securely joined to each other by the plurality of upper end joints 40 and lower end joints 45 which are symmetrically located on opposite sides (up and down) of a horizontal plane of symmetry.

As shown in FIGS. 4 to 10, the plate member 30 has a plurality (eight in this embodiment) of openings 35 formed therein at properly determined intervals widthwise across the vehicle body as well as a plurality (fourteen in this embodiment) of bead portions 36 extending obliquely between the upper end joints 40 and the lower end joints 45, each of the bead portions 36 passing between two adjacent openings 35 and interconnecting (or bridging) the corresponding upper end and lower end joints 40, 45 in the vehicle bumper structure 1 of the embodiment. Additionally, the plate member 30 has a pair of upper and lower horizontal bead portions 37 extending horizontally widthwise across the vehicle body all along upper and lower ends of the plate member 30, the individual bead portions 36 extending obliquely and being connected at upper and lower ends thereof to the upper and lower horizontal bead portions 37, respectively.

Figure 6:
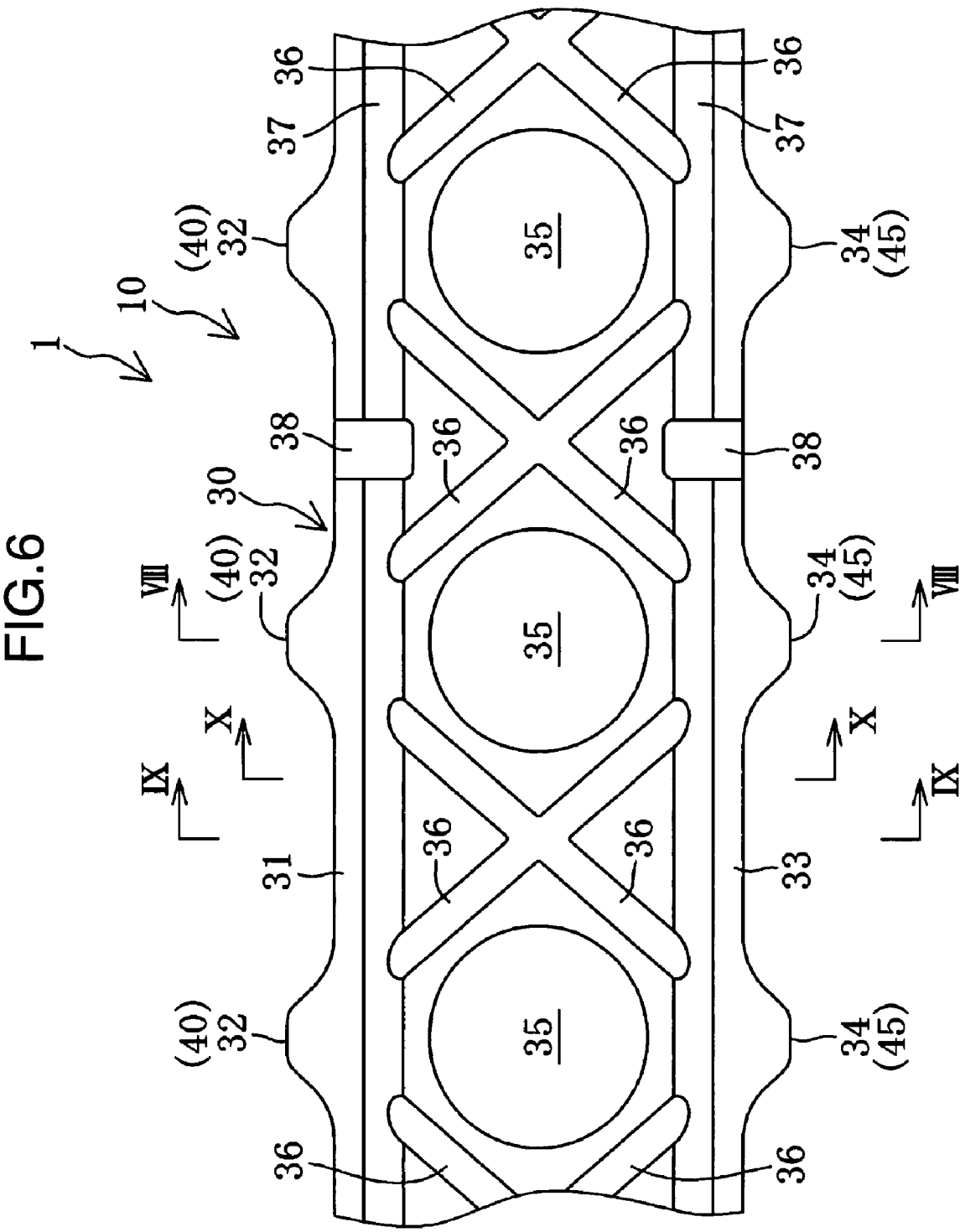
FIG. 6 is a fragmentary front view of the bumper reinforcement of FIG. 5.
Figure 7:
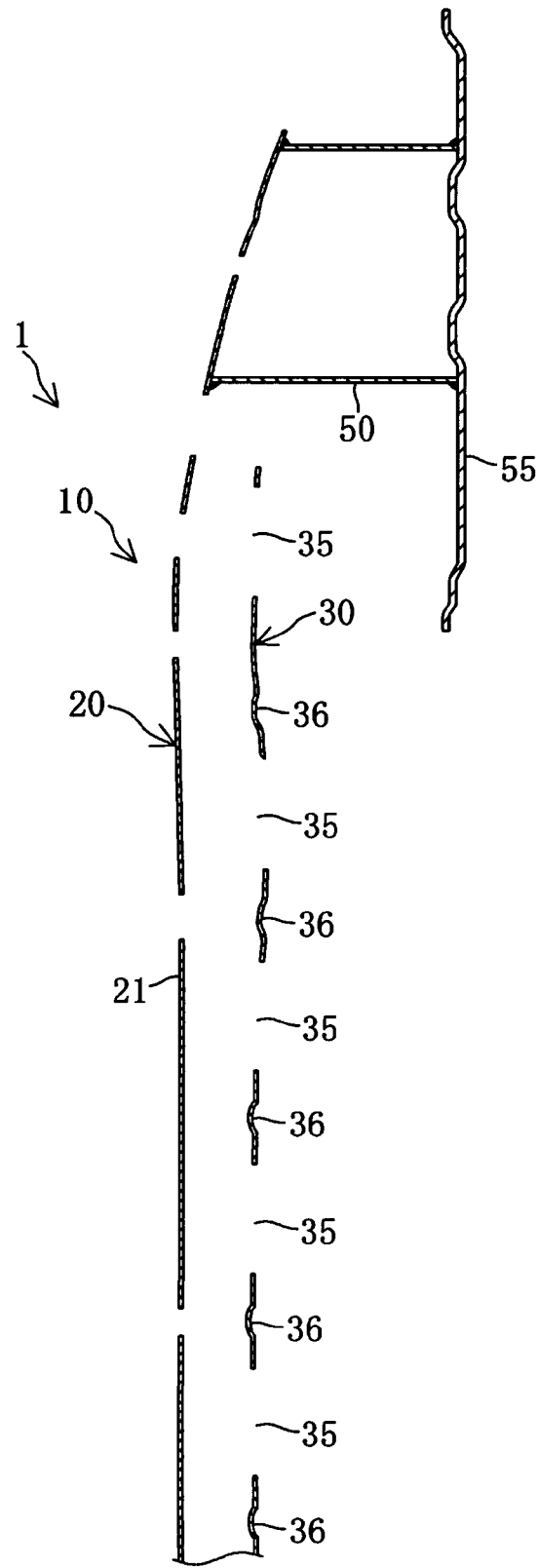
FIG. 7 is a cross-sectional view taken along lines VII-VII of FIG. 5.

The openings 35 formed in the plate member 30 are circular holes, each having a specified diameter (which is a little larger than the height of the plate member 30, for instance). The plurality of these circular openings 35 are formed between the upper end and lower end joints 40, 45 in such a way that each successive opening 35 is positioned at a location between the corresponding upper end and lower end joints 40, 45 as shown in FIG. 6. More specifically, each pair of crossing bead portions 36 extends obliquely between the upper and lower horizontal bead portions 37 in such a way that any given bead portion 36 bridges one upper end joint 40 to the lower end joint 45 adjacent to the lower end joint 45 located immediately below that upper end joint 40, the bead portion 36 partially bulging rearward into the beam member 20 (refer to FIGS. 9 and 10), whereby each successive pair of crossing bead portions 36 disposed between two adjacent openings 35 interconnects two each adjacent upper end and lower end joints 40, 45 as illustrated (FIG. 6).

Figure 8:
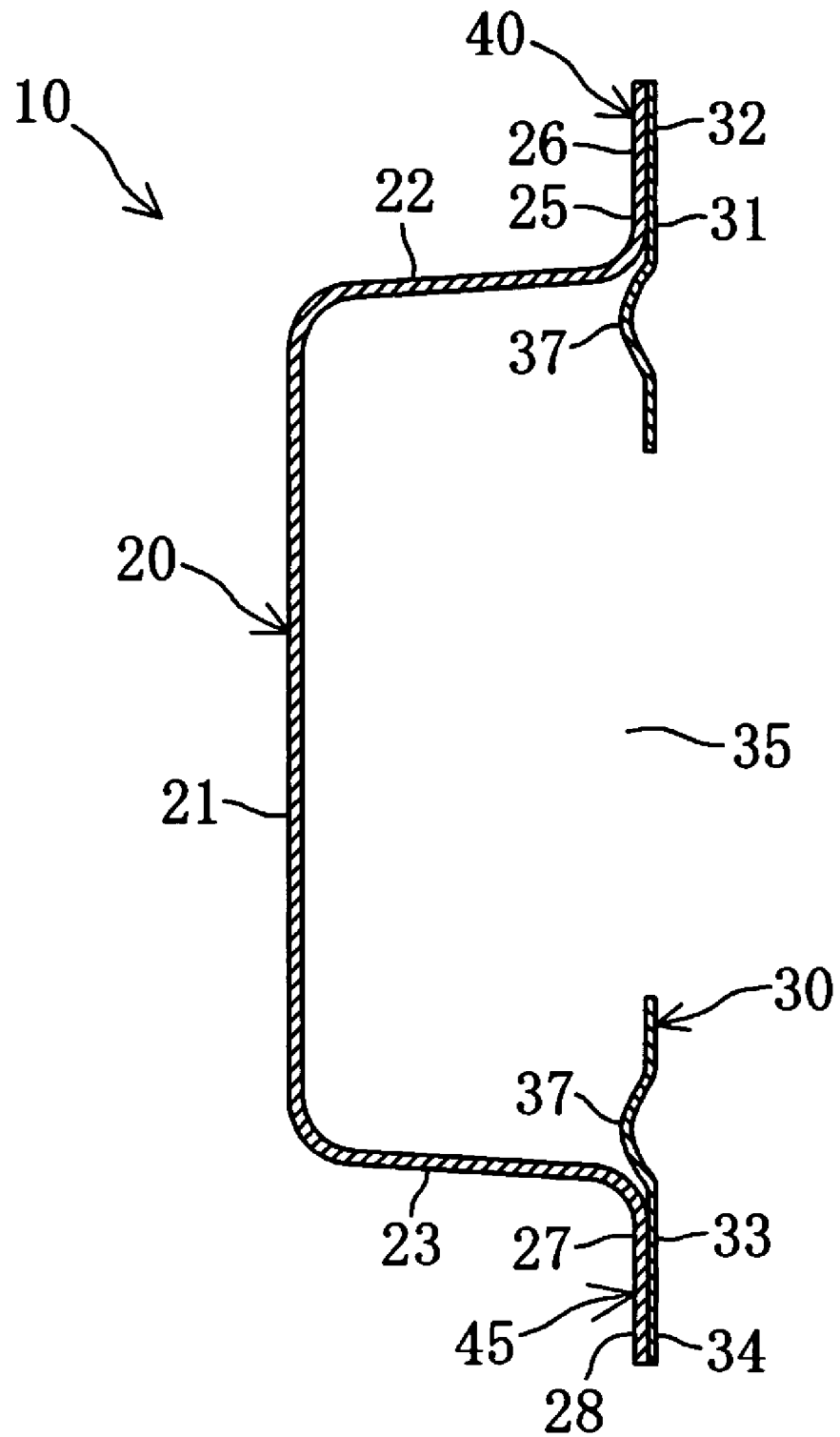
FIG. 8 is a cross-sectional view taken along lines VIII-VIII of FIG. 6.
Figure 9:
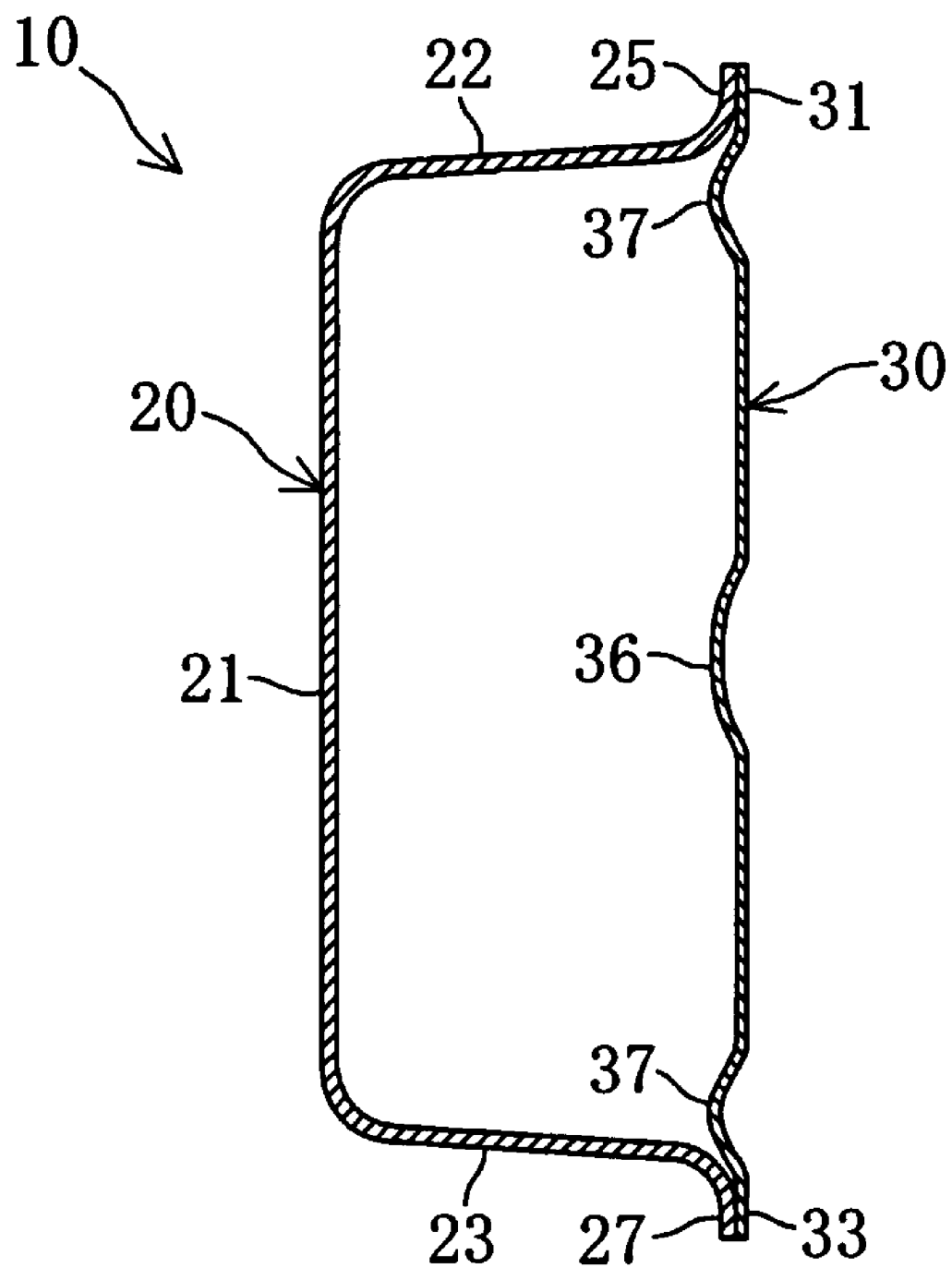
FIG. 9 is a cross-sectional view taken along lines IX-IX of FIG. 6.
Figure 10:
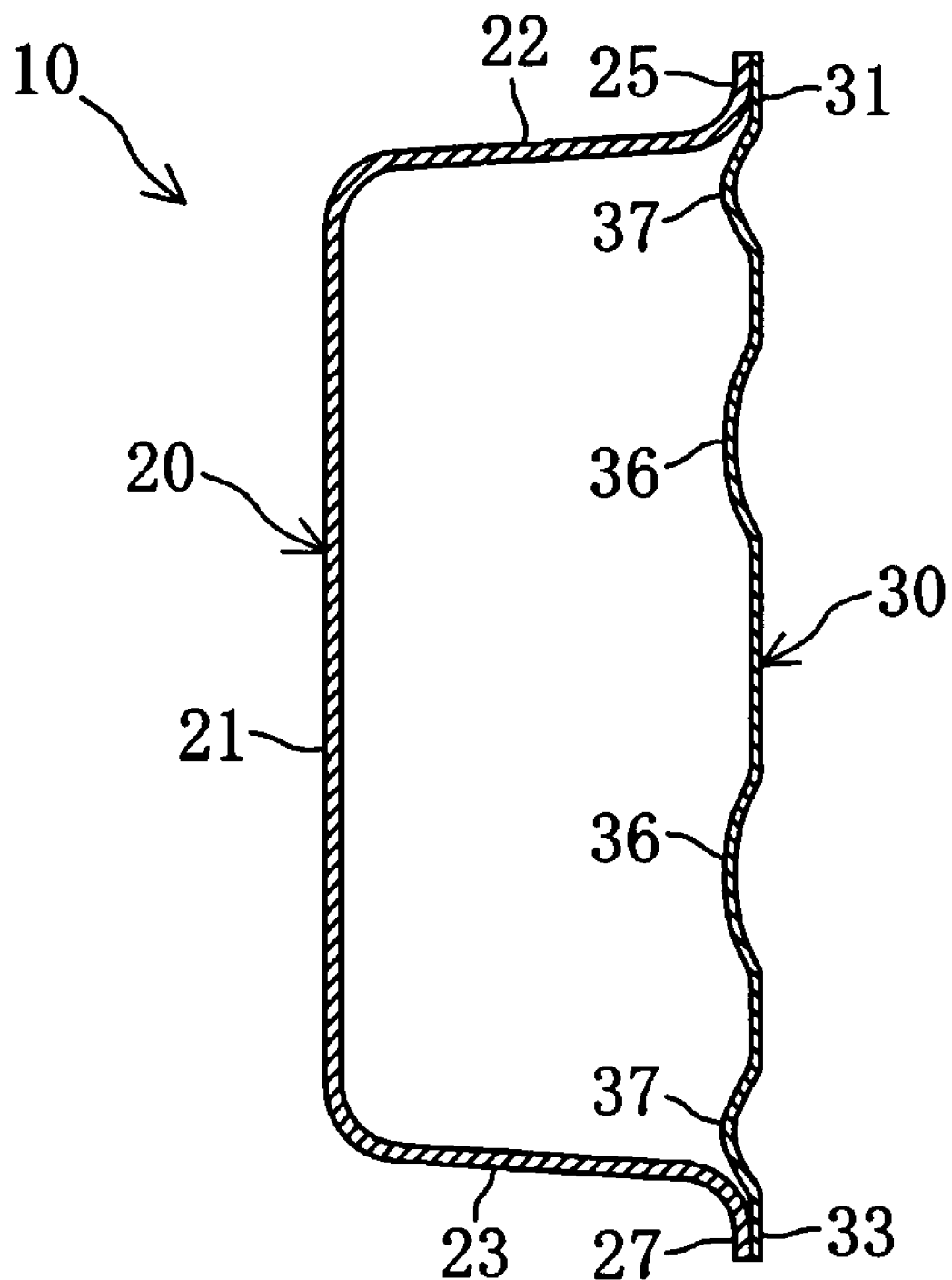
FIG. 10 is a cross-sectional view taken along lines X-X of FIG. 6.

The horizontal bead portion 37 is shaped to bulge rearward into the beam member 20 (refer to FIGS. 8 to 10). The plate member 30 further has a pair of upper and lower vertical bead portions 38 at upper and lower mid-length positions of the plate member 30, the vertical bead portions 38 intersecting the upper and lower horizontal bead portions 37 and each having a relatively short length (vertical dimension) approximately one fifth the height of the plate member 30, for instance. The upper and lower vertical bead portions 38 are shaped to bulge in a direction opposite to the beam member 20 (that is, a frontward direction opposite to the bulging direction of the bead portions 36, 37). Due to the provision of the upper and lower vertical bead portions 38, there are formed through holes which connect an internal space formed between the beam member 20 and the plate member 30 to the exterior. These through holes formed between the vertical bead portions 38 and the beam member 20 serve as passages for discharging excess electrodeposition fluid when the bumper reinforcement 10 is subjected to electrodeposition process with at least the beam member 20 and the plate member 30 assembled together so that the electrodeposition fluid will not be left in the internal space of the bumper reinforcement 10. The provision of the upper and lower vertical bead portions 38 ensures that the excess electrodeposition fluid will be discharged to the exterior in a reliable fashion even when the bumper reinforcement 10 is subjected to the electrodeposition process in an inverted position (upside down). In one variation of the embodiment, there may be provided a plurality of vertical bead portions 38 intersecting each of the upper and lower horizontal bead portions 37 at properly determined intervals across the vehicle body.

In the above-described vehicle bumper structure 1 of the first embodiment, the bumper reinforcement 10 includes the beam member 20 extending widthwise generally all across the vehicle body, the bumper reinforcement 10 having a C-shaped cross section, the plate member 30 extending widthwise along the beam member 20 and closing off an open end thereof, the plurality of upper end and lower end joints 40, 45 formed respectively at the upper ends and the lower ends of the beam member 20 and the plate member 30 for joining these two facing members 20, 30 at plural points along the bumper reinforcement 10. A first advantage of the bumper structure 1 thus configured is that it is possible to reinforce the beam member 20 by a closed cross section, or a so-called box section, partially formed between the beam member 20 and the plate member 30.

A second advantage of the first embodiment is that the above-described bumper structure 1 allows for lightweight design of the bumper reinforcement 10 because the plurality of openings 35 are made in the plate member 30 at properly determined intervals widthwise across the vehicle body. On the other hand, as there are formed the plurality of bead portions 36 extending between the adjacent openings 35 in the plate member 30, each of the bead portions 36 interconnecting one upper end joint 40 and the corresponding lower end joint 45, it is possible to join both ends of each bead portion 36 to the beam member 20 with enhanced strength and reinforce portions of the plate member 30 between the adjacent openings 35 in the plate member 30 by the bead portions 36 in a reliable fashion. Consequently, compared to a bumper reinforcement in which only a plurality of openings are formed in a plate member, the plurality of bead portions 36 formed between the adjacent openings 35 significantly increase the strength and stiffness, including torsional stiffness, of the bumper reinforcement 10. In other words, the bead portions 36 of this embodiment serve to prevent a reduction in the strength and stiffness of the bumper reinforcement 10 which may otherwise result from the provision of the openings 35 formed in the plate member 30.

According to the above-described first embodiment, each successive opening 35 in the plate member 30 is formed at a location between the corresponding upper end and lower end joints 40, 45. This arrangement produces an additional advantage that each pair of crossing bead portions 36 extends obliquely between the upper and lower horizontal bead portions 37 in such a way that any given bead portion 36 bridges one upper end joint 40 to the lower end joint 45 adjacent to the lower end joint 45 located immediately below that upper end joint 40, thereby increasing the torsional stiffness of the bumper reinforcement 10 in a reliable fashion.

Furthermore, the two bead portions 36 formed between any two adjacent openings 35 cross each other and connect a pair of upper end joints 40 to a pair of lower end joints 45 crosswise. This configuration of the embodiment makes it possible to form a larger number of bead portions 36 in the plate member 30 to thereby provide yet increased torsional stiffness of the bumper reinforcement 10 against torsional stresses exerted in varying directions.

Moreover, the plate member 30 has the upper and lower horizontal bead portions 37 extending horizontally widthwise across the vehicle body all along the upper and lower ends of the plate member 30, the individual obliquely extending bead portions 36 being connected at the upper and lower ends thereof to the upper and lower horizontal bead portions 37, respectively. This configuration allows for still enhanced torsional stiffness of the bumper reinforcement 10 as well as flexural stiffness thereof along a longitudinal direction of the vehicle body.

Second Embodiment

Figure 11:
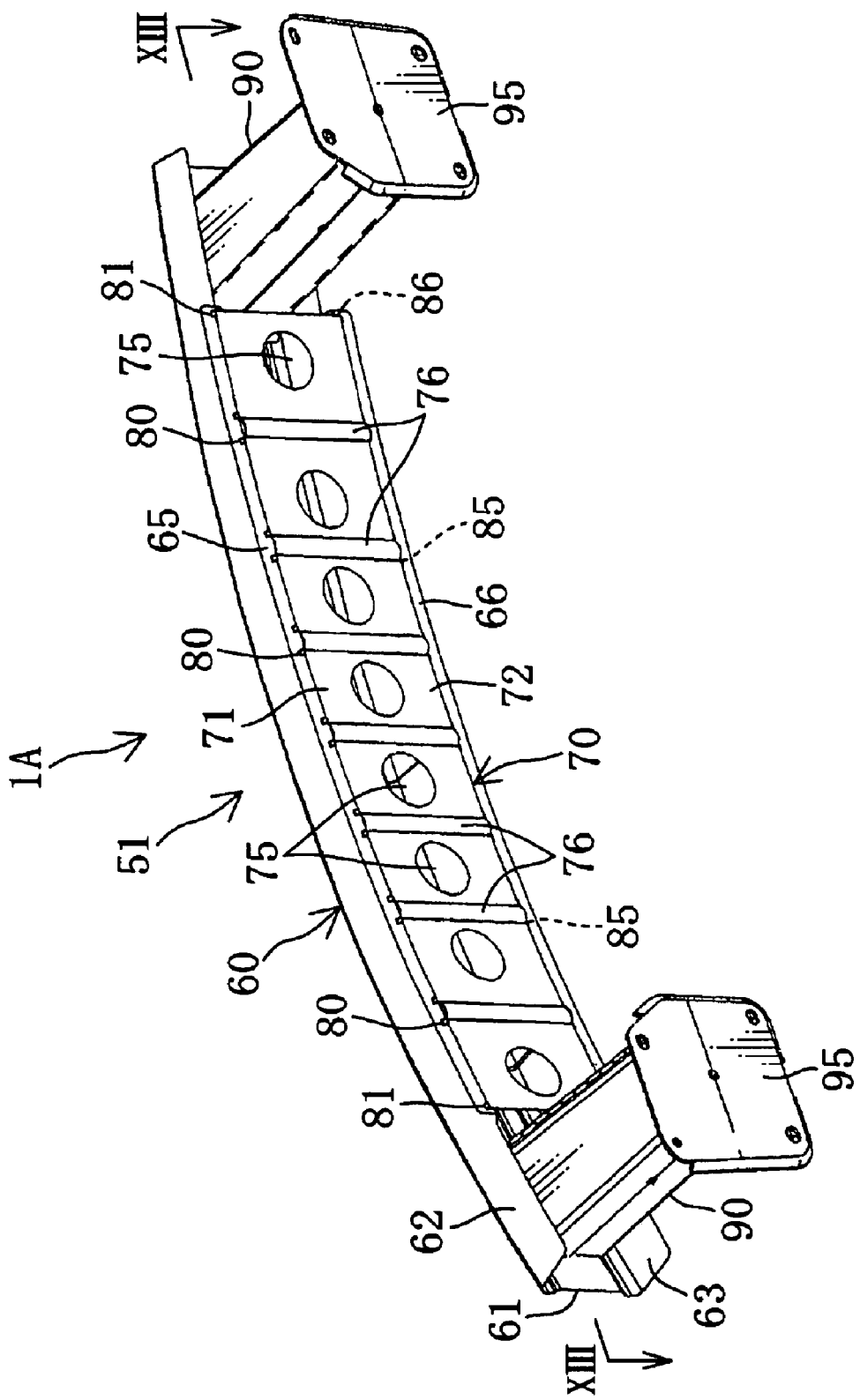
FIG. 11 is a perspective view of a bumper reinforcement according to a second embodiment of the invention as viewed obliquely from a front side.
Figure 12:
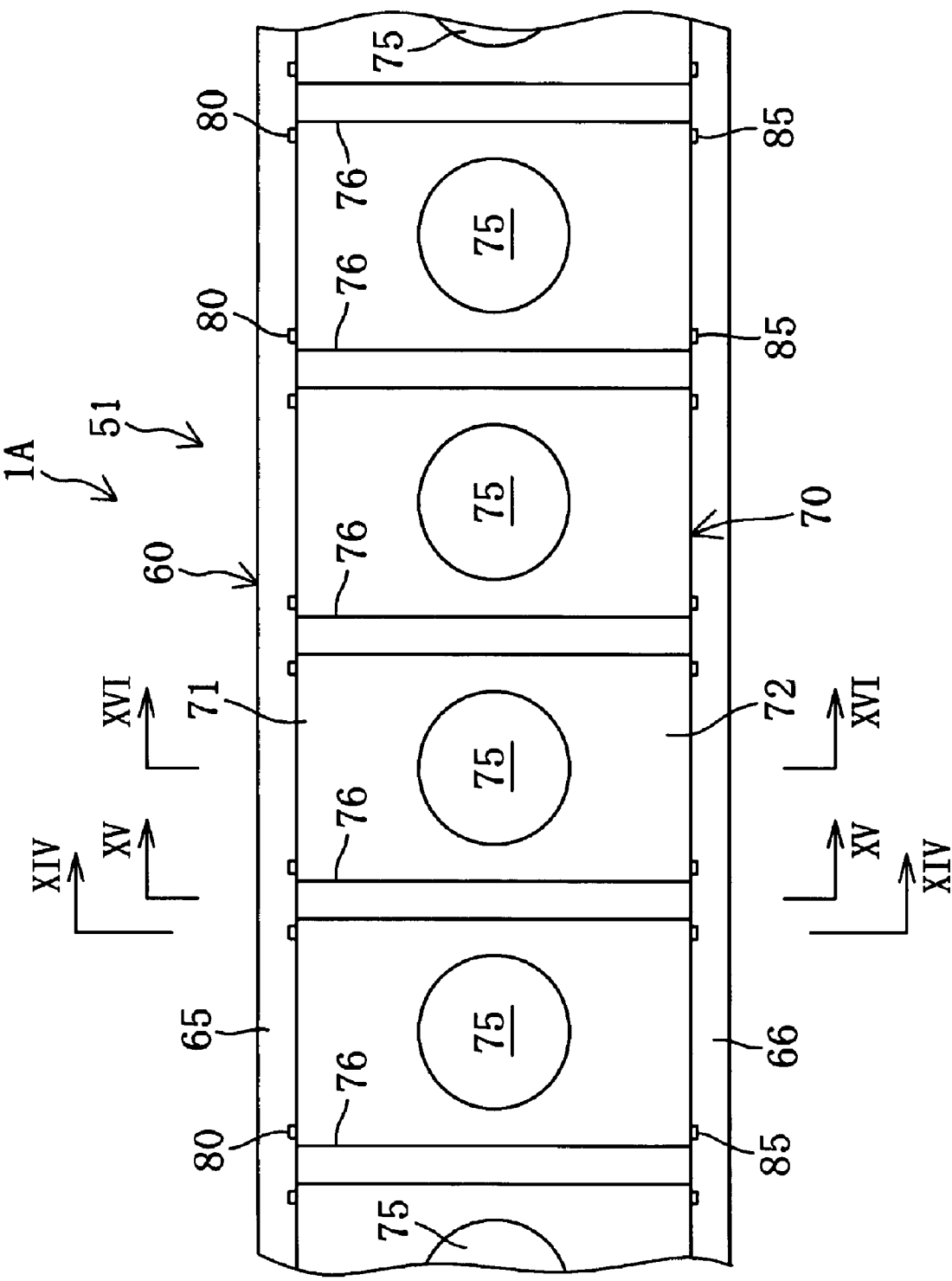
FIG. 12 is a fragmentary front view of the bumper reinforcement of FIG. 11.
Figure 13:
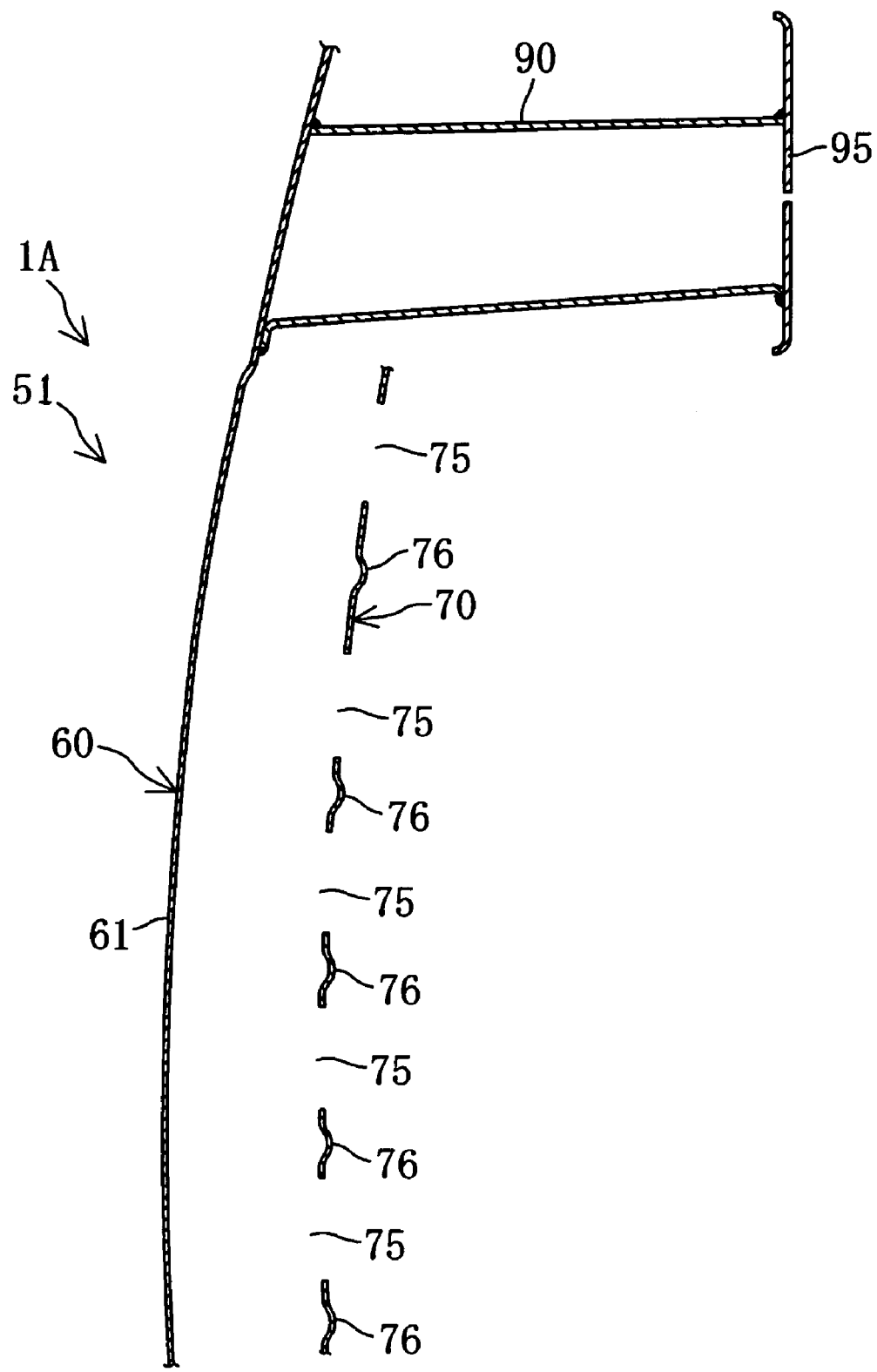
FIG. 13 is a cross-sectional view taken along lines XIII-XIII of FIG. 11.
Figure 14:
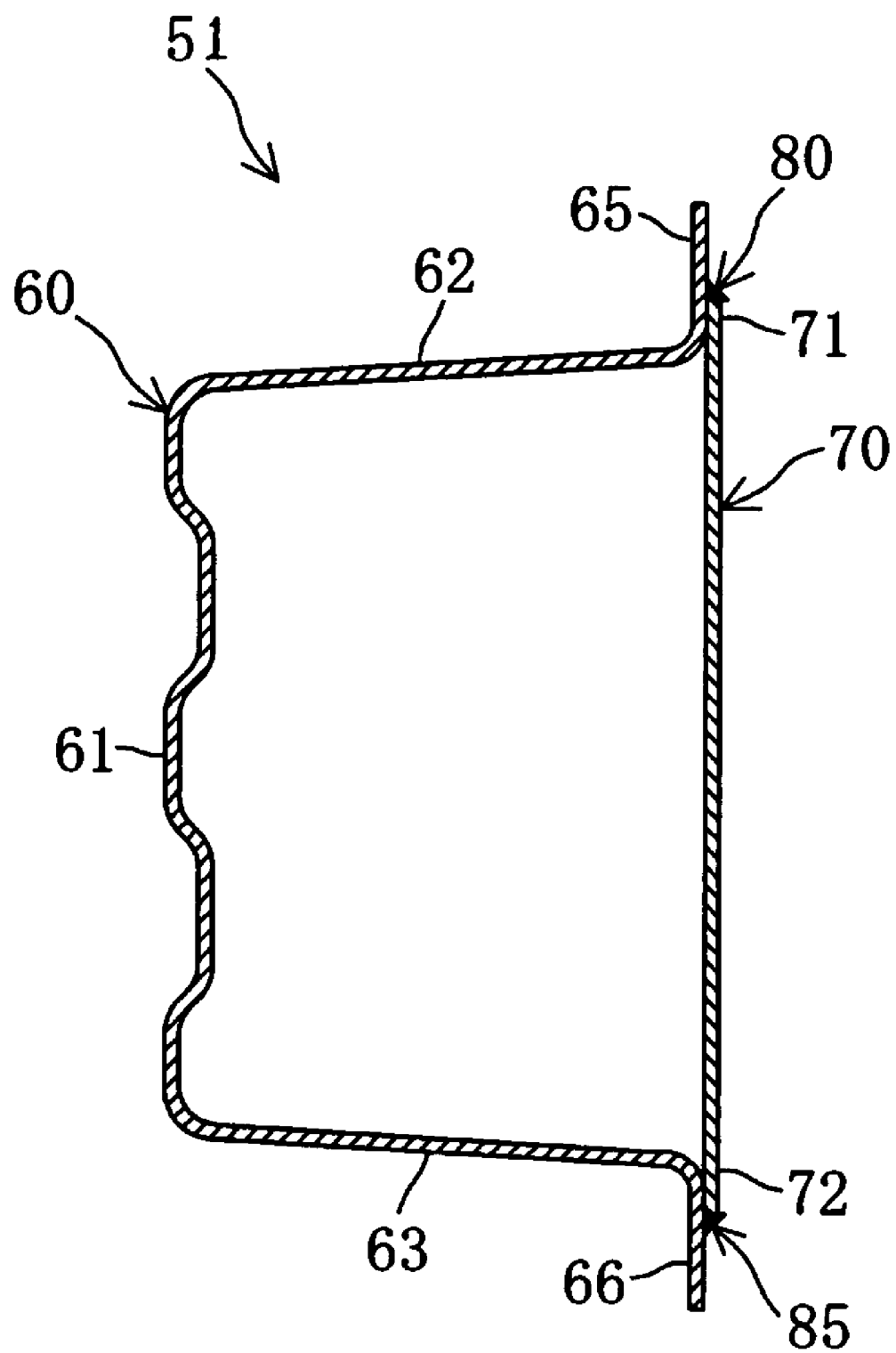
FIG. 14 is a cross-sectional view taken along lines XIV-XIV of FIG. 12.
Figure 15:
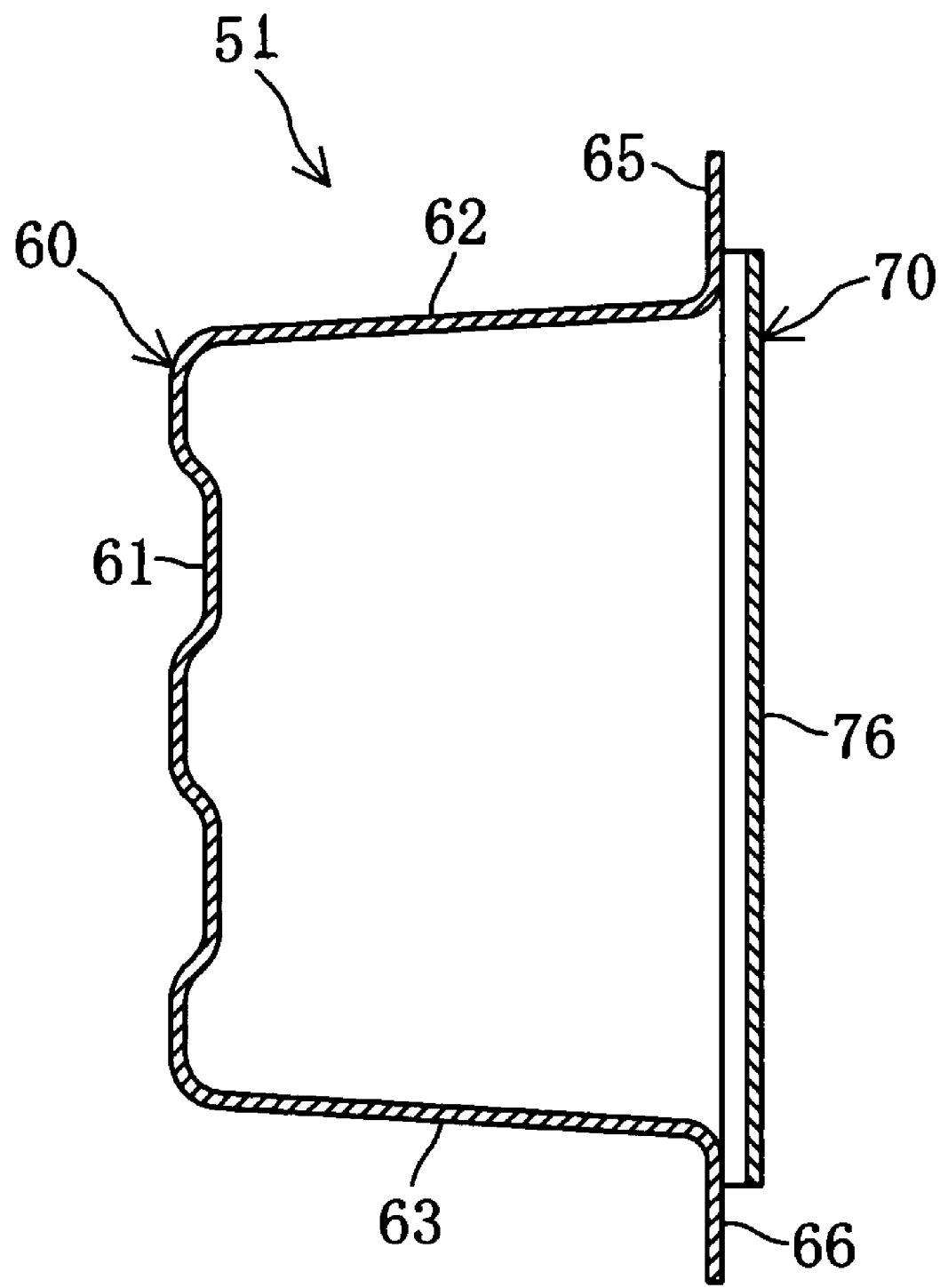
FIG. 15 is a cross-sectional view taken along lines XV-XV of FIG. 12.
Figure 16:
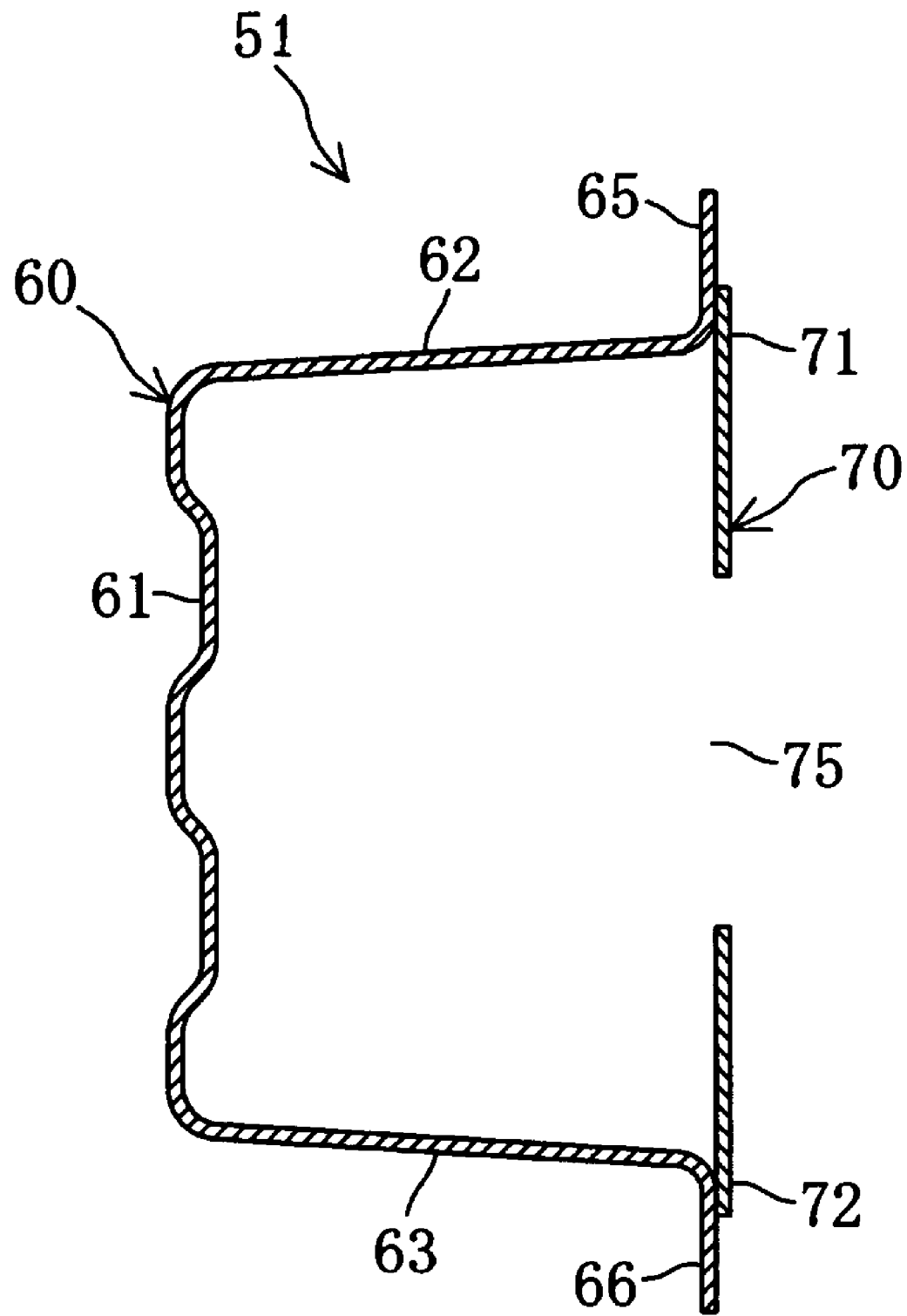
FIG. 16 is a cross-sectional view taken along lines XVI-XVI of FIG. 12.

FIGS. 11 to 16 are diagrams showing a vehicle bumper structure 1A according to a second embodiment of the invention. The bumper structure 1A of this embodiment is essentially a variation of the bumper structure 1 of the first embodiment. Referring to FIG. 11, the bumper structure 1A includes a bumper reinforcement 51 which is a modified version of the bumper reinforcement 10 of the first embodiment Specifically, the bumper reinforcement 51 includes a beam member 60, a plate member 70, a plurality (a total of nine each in this embodiment) of upper end joints 80, 81 and lower end joints 85, 86 as well as a pair of left and right crush cans 90 and a pair of left and right flange members 95. All these elements of the bumper reinforcement 51 have basically the same constructions and functions as their counterparts of the first embodiment.

The beam member 60 has a rear wall portion 61, a top face portion 62 and a bottom face portion 63 together forming a frontward-opening C-shaped cross section. The beam member 60 also has a top end flange 65 which is formed as if by bending a front marginal part of the top face portion 62 of the beam member 60 upward as well as a bottom end flange 66 which is formed as if by bending a front marginal part of the bottom face portion 63 of the beam member 60 downward.

Having a slightly smaller height than an overall height of the beam member 60 (i.e., the distance between an upper end of the top end flange 65 and a lower end of the bottom end flange 66) and a little smaller left-to-right dimension (length) than the distance between the two crush cans 90, the plate member 70 is shaped in a generally vertical flat platelike form and disposed to close off an open end of the beam member 60 at a front side thereof. Along an upper end of the plate member 70, there is formed an upper end contact part 71 which goes into contact with the top end flange 65 of the beam member 60, and along a lower end of the plate member 70, there is formed a lower end contact part 72 which goes into contact with the bottom end flange 66 of the beam member 60.

With the top and bottom end flanges 65, 66 at the upper and lower ends of the beam member 60 held in contact with the upper and lower end contact parts 71, 72 at the upper and lower ends of the plate member 70, respectively, left and right end portions of the top end flange 65 are brazed to corresponding end portions of the upper end contact part 71 to form the aforementioned two upper end joints 81. Additionally, between the two upper end joints 81, plural pairs of nearby points (seven pairs of nearby points, or fourteen points in total, in this embodiment) of the top end flange 65 are brazed to corresponding points of the upper end contact part 71 to form the aforementioned plurality (seven in this embodiment) of upper end joints 80.

Similarly, left and right end portions of the bottom end flange 66 are brazed to corresponding end portions of the lower end contact part 72 to form the aforementioned two lower end joints 86. Additionally, between the two lower end joints 86, plural pairs of nearby points (seven pairs of nearby points, or fourteen points in total, in this embodiment) of the bottom end flange 66 are brazed to corresponding points of the lower end contact part 72 to form the aforementioned plurality (seven in this embodiment) of lower end joints 85. The plural upper end joints 80 and the plural lower end joints 85 thus formed are arranged symmetrically in the bumper reinforcement 51 of this embodiment.

In the vehicle bumper structure 1A of the present embodiment, the plate member 70 has a plurality (eight in this embodiment) of openings 75 formed therein at properly determined intervals widthwise across the vehicle body as well as a plurality (seven in this embodiment) of bead portions 76, each of the bead portions 76 passing between two adjacent openings 75 and interconnecting (or bridging) the corresponding upper end and lower end joints 80, 85.

The openings 75 formed in the plate member 70 are circular holes, each having a specified diameter (which is approximately one-third the height of the plate member 70, for instance). Each of these circular openings 75 is formed between one pair of upper end joints 80 and the corresponding pair of lower end joints 85 located just beneath that one pair of upper end joints 80 as shown in FIG. 6. Each of the aforementioned bead portions 76 is formed to extend vertically, bulging frontward and connecting one upper end joint 80 to the lower end joint 85 located just beneath that upper end joint 80. Extreme left and right points of upper end and lower end portions of each bead portion 76 of the plate member 70 pairs of "nearby points" corresponding to the upper end joint 80 and the lower end joint 85.

In the vehicle bumper structure 1 of the second embodiment, each of the openings 75 is formed between one pair of upper end joints 80 and the corresponding pair of lower end joints 85 located just beneath that one pair of upper end joints 80. Thus, each bead portion 76 can be formed generally in a vertical straight line interconnecting one each upper end joint 80 and lower end joint 85 located on the vertical straight line. With such a simple construction, it is possible to achieve a reduction in weight of the bumper reinforcement 51 and prevent a reduction in the strength and stiffness thereof. The above-described bumper structure 1 of the second embodiment basically produces otherwise the same advantageous effects as the bumper structure 1 of the first embodiment.

Third Embodiment

Figure 17:
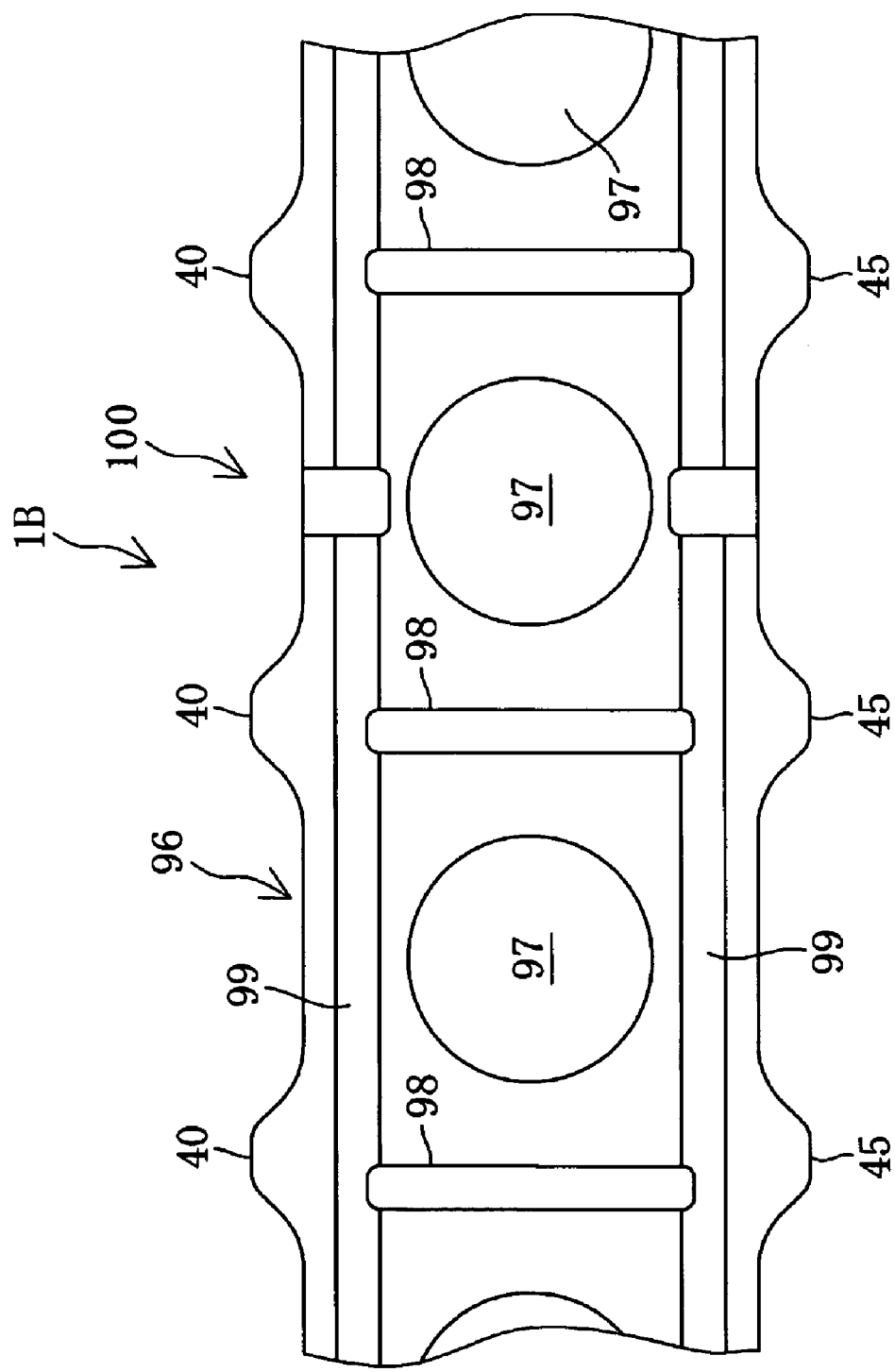
FIG. 17 is a fragmentary front view of a bumper reinforcement according to a third embodiment of the invention.

FIG. 17 is a fragmentary front view of a bumper reinforcement 100 of a vehicle bumper structure 1B according to a third embodiment of the invention. The bumper structure 1B of this embodiment is obtained by modifying the bumper structure 1 of the first embodiment with respect to the openings 35 and the bead portions 36 thereof. Referring to FIG. 17, the bumper reinforcement 100 of this embodiment includes a plate member 96 in which a plurality of openings 97 are formed at properly determined intervals widthwise across the vehicle body. In addition, there are formed a plurality of bead portions 98, each of the bead portions 98 passing between two adjacent openings 97 and interconnecting (or bridging) corresponding upper end and lower end joints 40, 45.

The openings 97 formed in the plate member 96 are circular holes, each having a specified diameter (which is a little larger than the height of the plate member 96, for instance). Each of these circular openings 97 is formed between one pair of upper end joints 40 and the corresponding pair of lower end joints 45 located just beneath that one pair of upper end joints 40 as shown in FIG. 17. Each of the aforementioned bead portions 98 is formed to extend vertically, bulging frontward and connecting one upper end joint 40 to the lower end joint 45 located just beneath that upper end joint 40. Additionally, the plate member 96 has a pair of upper and lower horizontal bead portions 99 extending horizontally widthwise across the vehicle body generally all along upper and lower ends of the plate member 96, the individual bead portions 98 extending vertically and being connected at upper and lower ends thereof to the upper and lower horizontal bead portions 99, respectively.

The numbers, shapes and dimensions of the openings 35, 75, 97 and the bead portions 36, 76, 98 of the foregoing first, second and third embodiments may be varied as appropriate. Also, the above-described vehicle bumper structures 1, 1A 1B of the foregoing embodiments may be varied in various ways without departing from the scope and spirit of the invention as defined in the appended claims. It should be apparent to those skilled in the art that the present invention can be applied to not only to rear but also to front bumper structures of various types of vehicles.

In summary, a vehicle bumper structure of the invention includes a bumper reinforcement mounted between extreme ends of left and right body frame members of a vehicle, the bumper reinforcement including a beam member extending widthwise generally all across a vehicle body, the beam member having a C-shaped cross section, a plate member extending widthwise along the beam member and closing off an open end thereof, a plurality of upper end joints by which upper ends of the beam member and the plate member are joined at plural points arranged widthwise, and a plurality of lower end joints by which lower ends of the beam member and the plate member are joined at plural points arranged widthwise. In this vehicle bumper structure, the plate member has a plurality of openings formed therein at properly determined intervals widthwise across the vehicle body as well as a plurality of bead portions, each of the bead portions passing between two adjacent openings and bridging one of the upper end joints to the corresponding one of the lower end joints.

In the vehicle bumper structure thus configured, there is partially formed a closed cross section, or a so-called box section, between the beam member and the plate member and this closed cross section serves to reinforce the beam member. Also, the openings formed in the plate member allows for a reduction in weight of the bumper reinforcement, while the plurality of bead portions formed on the plate member serve to prevent a reduction in the strength and stiffness of the bumper reinforcement which may otherwise result from the provision of the openings formed in the plate member.

More specifically, as there are formed the plurality of bead portions (36, 76, 98) bridging the individual upper end joints (40, 80) to the corresponding lower end joints (45, 85), both ends of each bead portion are joined to the beam member with enhanced strength, and as each bead portion extends between two adjacent openings, the bead portions reinforce portions of the plate member in a reliable fashion. Consequently, compared to a bumper reinforcement in which only a plurality of openings are formed in a plate member, the bead portions of this invention significantly increase the strength and stiffness, including torsional stiffness, of the bumper reinforcement.

While the plurality of upper end joints join the upper ends of the beam member (20, 60) and the plate member (30, 70, 96) at the plural points arranged widthwise and the plurality of lower end joints (45, 85) join the lower ends of the beam member (20, 60) and the plate member (30, 70, 96) at the plural points by welding, each of the bead portions connects one of the upper end joints (40, 80) to the corresponding one of the lower end joints (45, 85). This arrangement helps prevent a reduction in the strength and stiffness of the bumper reinforcement without joining the beam member and the plate member at unnecessarily many points along the upper ends of the beam member (20, 60) and the plate member (30, 70, 96).

As a consequence, the beam member (20, 60) and the plate member (30, 70, 96) can be joined together without an increase in work load for joining. This makes it possible to achieve improved manufacturing efficiency of the bumper reinforcement and a reduction in manufacturing cost.

In one preferable feature of the invention, each of the openings (35) is formed between one upper end joint (40) and one lower end joint (45) located just beneath that upper end joint (40), and each of the bead portions (36) is formed to extend obliquely, connecting one upper end joint (40) to one lower end joint (45) adjacent to another lower end joint (45) located just beneath that one upper end joint (40).

According to this arrangement, each successive opening in the plate member is formed at a location between the corresponding upper end and lower end joints. This produces an advantage that each pair of crossing bead portions extends obliquely between the upper and lower horizontal bead portions in such a way that any given bead portion bridges one upper end joint to the lower end joint adjacent to the lower end joint located immediately below that upper end joint, thereby increasing the torsional stiffness of the bumper reinforcement in a reliable fashion.

In another preferable feature of the invention, two bead portions (36) formed between any two adjacent openings (35) cross each other and connect a pair of upper end joints (40) to a pair of lower end joint (45) located just beneath the pair of upper end joints (40).

According to this arrangement, the two bead portions formed between any two adjacent openings cross each other and connect a pair of upper end joints to a pair of lower end joints crosswise. This makes it possible to form a larger number of bead portions in the plate member to thereby provide yet increased torsional stiffness of the bumper reinforcement against torsional stresses exerted in varying directions.

In still another preferable feature of the invention, each of the openings (75) is formed between one pair of upper end joints (80) and the corresponding pair of lower end joints (85) located just beneath that one pair of upper end joints (80), and each of the bead portions (76, 98) is formed to extend vertically and connect one upper end joint (80) to one lower end joint (85) located just beneath that one upper end joint (80).

According to this arrangement, each of the openings is formed between one pair of upper end joints and the corresponding pair of lower end joints located just beneath that one pair of upper end joints. Thus, each bead portion can be formed generally in a vertical straight line interconnecting one each upper end joint and lower end joint located on the vertical straight line. With such a simple construction, it is possible to achieve a reduction in weight of the bumper reinforcement and prevent a reduction in the strength and stiffness thereof.

In yet another preferable feature of the invention, the plate member (30, 96) has a pair of upper and lower horizontal bead portions (37, 99) extending horizontally widthwise across the vehicle body generally all along upper and lower ends of the plate member (30, 96), the individual bead portions (36, 98) being connected at upper and lower ends thereof to the upper and lower horizontal bead portions (37, 99), respectively.

According to this arrangement, the plate member has the upper and lower horizontal bead portions extending horizontally widthwise across the vehicle body all along the upper and lower ends of the plate member, the individual obliquely extending bead portions being connected at the upper and lower ends thereof to the upper and lower horizontal bead portions, respectively. This allows for still enhanced torsional stiffness of the bumper reinforcement as well as flexural stiffness thereof along a longitudinal direction of the vehicle body.

This application is based on Japanese Patent Application Serial No. 2006-179408, filed with Japan Patent Office on Jun. 29, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle bumper structure comprising a bumper reinforcement mounted between extreme ends of left and right body frame members of a vehicle, said bumper reinforcement including:
   a beam member extending widthwise generally all across a vehicle body, said beam member having a C-shaped cross section;
   a plate member extending widthwise along said beam member and closing off an open end thereof;
   a plurality of upper end joints by which upper ends of said beam member and said plate member are joined at plural points arranged widthwise; and
   a plurality of lower end joints by which lower ends of said beam member and said plate member are joined at plural points arranged widthwise;
   wherein said plate member has a plurality of openings formed therein at properly determined intervals widthwise across the vehicle body as well as a plurality of bead portions, each of the bead portions passing between two adjacent openings and bridging one of said upper end joints to the corresponding one of said lower end joints.

2. The vehicle bumper structure according to claim 1, wherein each of the openings is formed between one of said plurality of upper end joints and one of said plurality of lower end joints located just beneath said one upper end joint, and each of the bead portions is formed to extend obliquely, connecting one of said plurality of upper end joints to one of said plurality of lower end joints adjacent to a lower end joint located just beneath said one upper end joint.

3. The vehicle bumper structure according to claim 2, wherein two bead portions of said plurality of bead portions are formed between two adjacent openings, cross each other and connect a pair of the plurality of upper end joints to a pair of the plurality of lower end joints located just beneath said pair of upper end joints.

4. The vehicle bumper structure according to claim 1, wherein each of the openings is formed between a pair of said plurality of upper end joints and a corresponding pair of said plurality of lower end joints located just beneath said pair of upper end joints, and each of the bead portions is formed to extend vertically and connect one of said upper end joints to one of said lower end joints located just beneath said one upper end joint.

5. The vehicle bumper structure according to claim 1, wherein said plate member has a pair of upper and lower horizontal bead portions extending horizontally widthwise across the vehicle body generally all along upper and lower ends of said plate member, the individual bead portions being connected at upper and lower ends thereof to said upper and lower horizontal bead portions, respectively.

* * * * *